(12) United States Patent
Alexander et al.

(10) Patent No.: US 12,428,309 B2
(45) Date of Patent: Sep. 30, 2025

(54) CATHODE MATERIAL AND PROCESS

(71) Applicant: EPSILON CARBON PRIVATE LTD., Fort Mumbai (IN)

(72) Inventors: Sam Alexander, Reading (GB); Christian Bruenig, Moosburg (DE); Holger Kunz, Moosburg (GB)

(73) Assignee: Epsilon Carbon Private Ltd., Fort Mumbai (IN)

( * ) Notice: Subject to any disclaimer, the term of this patent is extended or adjusted under 35 U.S.C. 154(b) by 636 days.

(21) Appl. No.: 17/755,616

(22) PCT Filed: Nov. 5, 2020

(86) PCT No.: PCT/GB2020/052800
§ 371 (c)(1),
(2) Date: May 3, 2022

(87) PCT Pub. No.: WO2021/090006
PCT Pub. Date: May 14, 2021

(65) Prior Publication Data
US 2022/0380227 A1    Dec. 1, 2022

(30) Foreign Application Priority Data

Nov. 7, 2019  (GB) ..................... 1916198

(51) Int. Cl.
*C01G 45/00* (2025.01)
*C01F 7/78* (2022.01)
(Continued)

(52) U.S. Cl.
CPC ............... *C01G 45/02* (2013.01); *C01F 7/78* (2022.01); *C01G 45/22* (2025.01); *C01G 53/04* (2013.01);
(Continued)

(58) Field of Classification Search
CPC . H01M 10/0525; C01G 45/02; C01G 45/006; C01G 53/006; C01G 53/04; C01F 7/78
See application file for complete search history.

(56) References Cited

U.S. PATENT DOCUMENTS

| 6,409,984 B1 | 6/2002 | Hattori et al. |
| 9,281,522 B2 | 3/2016 | Vogler et al. |

(Continued)

FOREIGN PATENT DOCUMENTS

| CN | 1170248 A | 1/1998 |
| CN | 1569650 A | 1/2005 |

(Continued)

OTHER PUBLICATIONS

Hsieh et al., Preparation Method of Lithium Nickel Manganese Oxide Anode Material, Jan. 2016, See the Abstract. (Year: 2016).*

(Continued)

*Primary Examiner* — Niki Bakhtiari
*Assistant Examiner* — Monique M Wills
(74) *Attorney, Agent, or Firm* — BakerHostetler

(57) ABSTRACT

The present invention belongs to the field of battery materials, and relates to a process for preparing a particulate lithium manganese nickel spinel compound, and materials produced by the process. The process of the invention uses Mn-containing precursors, Ni-containing precursors, Li-containing precursors and optionally M-containing precursor which form substantially no NOx gases during calcination. The particulate lithium manganese nickel spinel compound product of the process may find use in a lithium ion battery.

20 Claims, 9 Drawing Sheets

(51) Int. Cl.
*C01G 45/02* (2006.01)
*C01G 45/22* (2025.01)
*C01G 53/04* (2006.01)
*C01G 53/82* (2025.01)
*H01M 10/0525* (2010.01)

(52) U.S. Cl.
CPC ........ *C01G 53/82* (2025.01); *H01M 10/0525* (2013.01); *C01P 2004/62* (2013.01); *C01P 2006/40* (2013.01)

(56) References Cited

U.S. PATENT DOCUMENTS

| | | |
|---|---|---|
| 2009/0104530 A1 | 4/2009 | Shizuka et al. |
| 2011/0311869 A1 | 12/2011 | Oh et al. |
| 2012/0045690 A1 | 2/2012 | Xiang et al. |
| 2016/0308199 A1 | 10/2016 | Noguchi et al. |
| 2017/0214044 A1 | 7/2017 | Huang et al. |
| 2018/0261841 A1 | 9/2018 | Mitsumoto et al. |
| 2019/0051900 A1 | 2/2019 | Yamaguchi et al. |

FOREIGN PATENT DOCUMENTS

| | | | | |
|---|---|---|---|---|
| CN | 1 801 508 A | | 7/2006 | |
| CN | 102044672 A | | 5/2011 | |
| CN | 102779991 A | | 11/2012 | |
| CN | 102938460 A | | 2/2013 | |
| CN | 102157734 B | | 4/2013 | |
| CN | 104425810 A | * | 3/2015 | |
| CN | 102938460 B | | 4/2015 | |
| CN | 107840343 A | | 3/2018 | |
| CN | 108025927 A | | 5/2018 | |
| CN | 108352523 A | | 7/2018 | |
| EP | 2006937 A2 | | 12/2008 | |
| EP | B 425 705 A1 | | 1/2019 | |
| JP | 2002-158008 A | | 5/2002 | |
| JP | 2005 026218 A | | 1/2005 | |
| JP | 2012-116720 A | | 6/2012 | |
| JP | 2013-501316 A | | 1/2013 | |
| JP | 2013-129556 A | | 7/2013 | |
| JP | 5 435810 B2 | | 3/2014 | |
| JP | 2017098240 A | * | 6/2017 | ............ C09D 125/02 |
| WO | WO-2016011962 A1 | * | 1/2016 | ............. C01G 53/52 |

OTHER PUBLICATIONS

Hai et al., A Modified Lithium Nickel Manganese Oxide Material And Preparation Method Thereof And Lithium Ion Battery, Mar. 2015, See the Abstract. (Year: 2015).*

Abe et al., Conductive Paste for Lithium Ion Battery Positive Electrode, and Mixture Material Paste for Lithium Ion Battery Positive Electrode, Jun. 2017, See the Abstract. (Year: 2017).*

* cited by examiner

CATHODE MATERIAL AND PROCESS

FIELD OF THE INVENTION

The present invention relates to processes for preparing lithium manganese nickel oxide spinel materials, the lithium manganese nickel oxide spinel materials which result from those processes, and electrodes and cells comprising the materials.

BACKGROUND OF THE INVENTION

Lithium manganese oxides have been identified as useful cathode materials in lithium ion batteries. Of the lithium manganese oxides, compounds with the spinel structure, such as $LiMn_2O_4$ (stoichiometric spinel), $Li_2Mn_4O_9$ (oxygen-rich spinel) and $Li_4Mn_5O_{12}$ (lithium-rich spinel) have shown particular promise as cathode materials.

Such spinel compounds are made by combining metal salt precursor compounds, commonly metal nitrates such as manganese nitrate. Not only are nitrate precursors expensive, they necessitate treatment of the process exhaust gases to remove toxic $NO_x$ gases. However, so far no alternative way to prepare spinels of suitably high capacity has been suggested in the art.

There is therefore a need for improved processes for preparing spinel compounds for use in lithium battery applications, e.g. lithium ion battery applications, which can provide products which intercalate lithium at a high potential vs $Li/Li^+$, provide a high capacity and have good cyclability (capacity retention).

SUMMARY OF THE INVENTION

The inventors have found that a particular process for the preparation of lithium manganese nickel oxide (LM NO) spinel compounds not only provides compounds with high capacity and improved cyclability, but eliminates the generation of toxic $NO_x$ exhaust gases, thereby removing the need for costly, difficult and potentially dangerous exhaust gas treatment.

Accordingly, a first aspect of the invention is a process for the preparation of a particulate lithium manganese nickel spinel compound, the process comprising:
(a) preparing a composition comprising an Mn-containing precursor, a Ni-containing precursor, a Li-containing precursor and optionally an M-containing precursor, wherein a single compound may optionally contain two or more of Mn, Ni and M;
(b) milling the composition; and
(c) calcining the product of step (b);
wherein M is one or more elements selected from Al, Mg, Ti, Co, Cu and Cr;
and wherein the Mn-containing precursor, Ni-containing precursor, Li-containing precursor and optional M-containing precursor are selected such that substantially no $NO_x$ gases are formed during the calcination in step (c).

Some embodiments provide a process for the preparation of a particulate lithium manganese nickel spinel compound of Formula I:

   Formula I the process comprising:
(a) preparing a composition comprising an Mn-containing precursor, a Ni-containing precursor, a Li-containing precursor and optionally an M-containing precursor, wherein a single compound may optionally contain two or more of Mn, Ni and M;
(b) milling the composition; and
(c) calcining the product of step (b);
wherein M is one or more elements selected from Al, Mg, Ti, Co, Cu and Cr
$0.8 \le x \le 1.2$;
$y = 2 - z - a$;
$0.2 < z < 1.2$;
$0 \le a \le 0.06$; and
$3.5 \le b \le 5$;
and the Mn-containing precursor, Ni-containing precursor, Li-containing precursor and optional M-containing precursor are selected such that substantially no $NO_x$ gases are formed during the calcination in step (c).

The manufacturing method of the invention selects starting materials which do not generate $NO_x$ gas products when calcined, thereby removing the need for costly, difficult and potentially dangerous exhaust gas treatment to remove $NO_x$ gases (i.e. $NO_x$, $NO_2$ or a mixture thereof). Furthermore, the product spinel has very good properties. A high capacity of at least 120 mAh/g may be achieved, in some cases as high as 134 mAh/g. The product may retain at least 93% of initial capacity after 200 cycles at a discharge rate of C/2, and 23° C. at an electrode loading of 6 mg/cm², in some cases as high as 96% retention.

A second aspect of the invention is a lithium manganese nickel spinel compound obtained or obtainable by a process according to the first aspect.

A third aspect of the invention provides a positive active electrode material comprising the compound according to the second aspect.

A fourth aspect of the invention provides an electrode comprising the material according to the third aspect.

A fifth aspect of the invention provides a lithium secondary cell or battery comprising the electrode according to the fourth aspect.

A sixth aspect of the invention is the use of a compound according to the second aspect in a lithium secondary cell or battery.

A seventh aspect of the invention is a method of reducing or eliminating the emission of $NO_x$ gas product from a calcination process carried out during the manufacture of a particulate lithium manganese nickel spinel compound, comprising selecting an Mn-containing precursor, Ni-containing precursor, Li-containing precursor and optionally an M-containing precursor such that substantially no $NO_x$ gases are formed during the calcination, wherein M is one or more elements selected from Al, Mg, Co, Cu, Cr and Ti.

An eighth aspect of the invention is a method of improving the initial capacity and/or cyclability of a particulate lithium manganese nickel spinel compound, comprising the use of a Mn-containing precursor having a $D_{90}$ particle size less than 4 µm, for example less than 3 µm, during the manufacture of the lithium manganese spinel compound.

DETAILED DESCRIPTION

Figure 1:
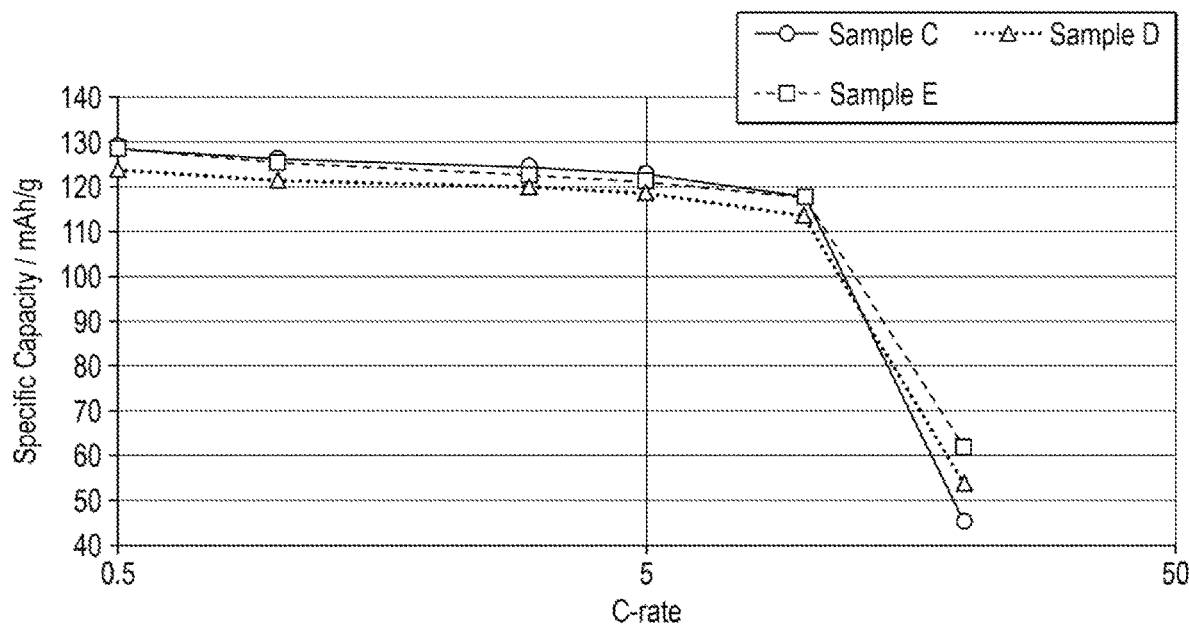
FIG. 1 is a plot of the specific capacity of three comparative materials (Samples C, D and E) at various discharge rates ("C-rates").

Preferred and/or optional features of the invention will now be set out. Any aspect of the invention may be combined with any other aspect of the invention unless the context demands otherwise. Any of the preferred and/or optional features of any aspect may be combined, either singly or in combination, with any aspect of the invention unless the context demands otherwise.

The exact composition of the final product lithium manganese nickel spinel in the process of the invention is not particularly limited. The invention concerns an improved process which is applicable to the preparation of a range of lithium manganese nickel spinel materials and the skilled person is able to tailor the identities and quantities of starting materials accordingly depending upon the desired end product.

In some embodiments, the particulate lithium manganese nickel spinel compound has a composition according to Formula I:

$$Li_xMn_yNi_zM_aO_b \quad \text{Formula I}$$

wherein M is one or more elements selected from Al, Mg, Ti, Co, Cu and Cr;
$0.8 \leq x \leq 1.2$;
$y = 2-z-a$;
$0.2 < z < 1.2$;
$0 \leq a \leq 0.06$; and
$3.5 \leq b \leq 4.5$.

In Formula I, $0.8 \leq x \leq 1.2$. In some embodiments x is greater than or equal to 0.9, or 0.95. In some embodiments, x is less than or equal to 1.1, or less than or equal to 1.05. In some embodiments, $0.90 \leq x \leq 1.10$, for example $0.95 \leq x \leq 1.05$. In some embodiments, x is about 1.0, for example equal to 1.0.

In Formula I, $0.2 < z < 1.2$. In some embodiments, $0.2 < z < 1.15$, for example $0.2 < z < 1.1$, $0.2 < z < 1.05$, $0.2 < z < 1.0$, $0.2 < z < 0.95$, $0.2 < z < 0.9$, $0.2 < z < 0.85$, $0.2 < z < 0.8$, $0.25 < z < 0.8$, $0.3 < z < 0.8$, $0.3 < z < 0.75$, $0.3 < z < 0.7$, $0.3 < z < 0.65$ or $0.3 < z < 0.6$. In some embodiments, $0.3 < z < 0.5$. In some embodiments, z is about 0.4, for example equal to 0.4.

In Formula I, $0 \leq a \leq 0.06$. In some embodiments, $0 \leq a \leq 0.06$, for example $0 \leq a \leq 0.059$, $0 \leq a \leq 0.058$, $0 \leq a \leq 0.057$, $0 \leq 0.056$, $0 \leq 0.055$, $0 \leq a \leq 0.054$, $0 \leq a \leq 0.053$, $0 \leq a \leq 0.052$, $0 \leq a \leq 0.051$, $0 \leq a \leq 0.05$, $0.01 \leq a \leq 0.06$, $0.02 \leq a \leq 0.06$, $0.03 \leq a \leq 0.06$, $0.03 \leq a \leq 0.055$, $0.03 \leq a \leq 0.05$, $0.035 \leq a \leq 0.06$ or $0.04 \leq a \leq 0.06$. In some embodiments, $a=0$. In some embodiments, a is about 0.05, for example equal to 0.05.

In Formula I, $3.5 \leq b \leq 4.5$. In some embodiments, $3.55 \leq b \leq 4.45$, for example $3.6 \leq b \leq 4.4$, $3.65 \leq b \leq 4.35$, $3.7 \leq b \leq 4.3$, $3.75 \leq b \leq 4.25$, $3.8 \leq b \leq 4.2$, $3.85 \leq b \leq 4.15$, $3.9 \leq b \leq 4.1$ or $3.95 \leq b \leq 4.05$. In some embodiments, b is about 4, for example equal to 4.

In Formula I, M is one or more elements selected from Al, Mg, Co, Cu and Cr. In some embodiments M is Al. In some embodiments M is Al and $0 < a \leq 0.06$, for example $0 < a \leq 0.059$, $0 < a \leq 0.058$, $0 < a \leq 0.057$, $0 < a \leq 0.056$, $0 < a \leq 0.055$, $0.01 < a \leq 0.06$, $0.02 < a \leq 0.06$, $0.03 < a \leq 0.06$, or a is about 0.05, for example equal to 0.05.

In Formula I, y is $(2-z-a)$. In some embodiments, $0.74 < y < 1.8$, for example $0.75 < y < 1.8$, $0.8 < y < 1.8$, $0.85 < y < 1.8$, $0.9 < y < 1.8$, $0.95 < y < 1.8$, $1.0 < y < 1.8$, $1.05 < y < 1.8$, $1.1 < y < 1.8$, $1.15 < y < 1.8$, $1.2 < y < 1.8$, $1.25 < y < 1.8$, $1.3 < y < 1.8$, $1.3 < y < 1.75$, $1.3 < y < 1.7$, $1.4 < y < 1.7$ or $1.5 < y < 1.7$. In some embodiments, y is about 1.55, for example equal to 1.55.

In some embodiments:
$0.8 \leq x \leq 1.2$;
$0.2 < z < 1.2$;
$0 \leq a \leq 0.06$; and
$3.5 \leq b \leq 4.5$;
wherein M is Al.
In some embodiments:
$0.8 \leq x \leq 1.2$;
$0.2 < z < 0.6$;
$0 \leq a \leq 0.06$; and
$3.5 \leq b \leq 4.5$.
In some embodiments:
$0.9 \leq x \leq 1.1$;
$0.2 < z < 0.6$;
$0 \leq a \leq 0.06$; and
$3.5 \leq b \leq 1.5$.
In some embodiments:
$0.9 \leq x \leq 1.1$;
$0.2 < z < 0.6$;
$0 \leq a \leq 0.06$; and
$3.9 \leq b \leq 4.1$.
In some embodiments:
$0.9 \leq x \leq 1.1$;
$0.3 < z < 0.5$;
$0 \leq a \leq 0.06$; and
$3.9 \leq b \leq 4.1$.
In some embodiments:
$0.9 \leq x \leq 1.1$;
$0.3 < z < 0.5$;
$a=0$; and
$3.9 \leq b \leq 4.1$.
In some embodiments:
$0.9 \leq x \leq 1.1$;
$0.3 < z < 0.5$;
$0.04 \leq a \leq 0.06$; and
$3.9 \leq b \leq 4.1$;
wherein M is Al.

In some embodiments, the lithium manganese nickel spinel compound of Formula I is selected from:

$LiMn_{1.6}Ni_{0.4}O_4$   Formula IA $LiMn_{1.55}Ni_{0.4}Al_{0.05}O_b$   Formula IB $LiMn_{1.55}Ni_{0.4}Ti_{0.05}O_b$   Formula IC $LiMn_{1.55}Ni_{0.40}O_{0.05}O_b$   Formula ID $LiMn_{1.50}Ni_{0.45}Al_{0.05}O_b$   Formula IE $LiMn_{1.45}Ni_{0.5}Al_{0.05}O_b$   Formula IF Wherein $3.5 \leq b \leq 4.5$. In some embodiments the lithium manganese nickel spinel compound of Formula I is selected from one of Formula IA to Formula IF and $b=4$. In some embodiments, the lithium manganese nickel spinel compound is a compound according to Formula IB and $b=4$.

In some embodiments, the particulate lithium manganese nickel spinel compound is a crystalline (or substantially crystalline) material. In some embodiments, the compound crystallises in the space group Fd-3m. In some embodiments, the lattice parameter is 8.170-8.180 Å, for example 8.170-8.175 Å, for example 8.170-8.174 Å, for example 8.171-8.174 Å.

The particles of lithium manganese nickel spinel typically have a $D_{50}$ particle size of at least 4.0 μm, for example at least 4.1 μm, at least 4.2 μm, at least 4.3 μm, at least 4.4 μm, at least 4.5 μm, at least 4.6 μm or at least 4.7 μm. In some embodiments, the particles of lithium manganese nickel spinel have a $D_{50}$ particle size of at least 7.0 μm, for example at least 7.1 μm, at least 7.2 μm, at least 7.3 μm or at least 7.4 μm. The particles of lithium manganese nickel spinel typically have a $D_{50}$ particle size of 10.0 μm or less, for example 10.0 μm or less, 9.5 μm or less, 9.0 μm or less, 8.5 μm or less, 8.0 μm or less, 7.9 μm or less, 7.8 μm or less, 7.7 μm or less, 7.6 μm or less or 7.5 μm or less. In some embodiments, the $D_{50}$ particle size is from about 4.0 μm to about 10.0 μm, for example from about 5.0 μm to about 9.0 μm. Unless otherwise specified herein, the $D_{50}$ particle size refers to $Dv_{50}$ (volume median diameter) and may be determined by a dynamic light scattering method (e.g. using a Malvern Mastersizer 2000), for example according to ASTM B822 of 2017 under the Mie scattering theory.

The particles of lithium manganese nickel spinel typically have a $D_{10}$ particle size of at least 1.5 μm, for example at least 1.6 μm, at least 1.7 μm, at least 1.8 μm, at least 1.9 μm, at least 2.0 μm, at least 2.2 μm or at least 2.5 μm. The particles of lithium manganese nickel spinel typically have a $D_{10}$ particle size of 4.0 μm or less, for example 3.9 μm or less, 3.8 μm or less, 3.7 μm or less, 3.6 μm or less or 3.5 μm or less. In some embodiments, the $D_{10}$ particle size is from about 1.5 μm to about 4.0 μm, for example from about 1.6 μm to about 3.9 μm, about 1.7 μm to about 3.8 μm, about 1.8 μm to about 3.7 μm, about 1.9 μm to about 3.6 μm or about 2.5 μm to about 3.6 μm. In some embodiments, the $D_{10}$ particle size is from about 1.0 μm to about 2.7 μm, for example from about 1.05 μm to about 3.7 μm, about 1.1 μm to about 3.7 μm. Unless otherwise specified herein, the $D_{10}$ particle size refers to Dv10 (10% intercept in the cumulative volume distribution) and may be determined by a dynamic light scattering method (e.g. using a Malvern Mastersizer 2000), for example according to ASTM B822 of 2017 under the Mie scattering theory.

The particles of lithium manganese spinel typically have a $D_{90}$ particle size of at least 12.0 μm, for example at least 12.5 μm, at least 13.0 μm, at least 13.5 μm, at least 14.0 μm, at least 14.5 μm or at least 15.0 μm. The particles of lithium manganese nickel spinel typically have a $D_{90}$ particle size of 18.0 μm or less, for example 17.9 μm or less, 17.8 μm or less, 17.5 μm or less, 17.0 μm or less or 16.5 μm or less. In some embodiments, the $D_{90}$ particle size is from about 12.0 μm to about 18.0 μm, for example from about 12.5 μm to about 18.0 μm, about 13.0 μm to about 18.0 μm, about 13.0 μm to about 17.0 μm, about 13.5 μm to about 17.0 μm, about 14.0 μm to about 18.0 μm, about 15.0 μm to about 17.0 μm, about 15.5 μm to about 17.0 μm, about 16.0 μm to about 16.5 μm, about 14.0 μm to about 16.0 μm, about 14.0 μm to about 15.5 μm, about 14.0 μm to about 15.0 μm, about 14.0 μm to about 14.5 μm or about 14.5 μm to about 15 μm. Unless otherwise specified herein, the $D_{90}$ particle size refers to Dv90 (90% intercept in the cumulative volume distribution) and may be determined by a dynamic light scattering method (e.g. using a Malvern Mastersizer 2000), for example according to ASTM B822 of 2017 under the Mie scattering theory.

In some embodiments, the particulate lithium manganese nickel spinel crystallites are substantially octahedral in shape, as determined from the analysis of an SEM image.

In some embodiments, the particulate lithium manganese nickel spinel compound has a bimodal particle size distribution. In some embodiments, a first peak of the bimodal particle size distribution occurs at around 4.0 to 7.0 μm and a second peak occurs at around 10.0 to 13.0 μm.

In some embodiments, the tapped density of the lithium manganese nickel spinel is from about 1.9 g/cm$^3$ to about 2.4 g/cm$^3$.

The tapped density of the material can suitably be measured according to ASTM B527. In some embodiments, the BET surface area of the lithium manganese nickel spinel is from about 0.5 cm$^2$/g to about 2.5 cm$^2$/g, for example from about 0.6 cm$^2$/g to about 2.0 cm$^2$/g, from about 0.6 cm$^2$/g to about 1.5 cm$^2$/g, from about 0.7 cm$^2$/g to about 1.4 cm$^2$/g, or about 1.0 cm$^2$/g.

The BET surface area of the material can suitably be measured by gas adsorption: Method of Brunauer, Emmett and Teller (BET) according DIN 66131 (Multi-point determination), for example using GEMINI 2360 (Micromeritics) apparatus.

In the process according to the invention, the first step (a) is to prepare a composition comprising an Mn-containing precursor, a Ni-containing precursor, a Li-containing precursor and optionally an M-containing precursor.

In some embodiments, step (a) comprises preparing a slurry comprising a solvent, an Mn-containing precursor, a Ni-containing precursor, a Li-containing precursor and optionally an M-containing precursor. Thus some embodiments of the invention provide a process for the preparation of a particulate lithium manganese nickel spinel compound, the process comprising:

(a) preparing a slurry comprising a solvent, an Mn-containing precursor, a Ni-containing precursor, a Li-containing precursor and optionally an M-containing precursor, wherein a single compound may optionally contain two or more of Mn, Ni and M;

(b) milling the slurry; and (c) calcining the product of step (b);

wherein M is one or more elements selected from Al, Mg, Ti, Co, Cu and Cr;

and wherein the Mn-containing precursor, Ni-containing precursor, Li-containing precursor and optional M-containing precursor are selected such that substantially no $NO_x$ gases are formed during the calcination in step (c).

The milling of a slurry rather than a dry precursor composition may assist in providing a more homogeneous mixture of the precursor components.

In some embodiments the process further comprises drying the slurry after the milling step (b) and before the calcining step (c). The drying may comprise spray-drying.

In some embodiments, the solvent is water. In some embodiments the solvent may be an alcohol.

In some embodiments, the first step (a) comprises preparing a composition comprising an Mn-containing precursor, a Ni-containing precursor, a Li-containing precursor and an M-containing precursor. In some embodiments, the first step (a) comprises preparing a slurry comprising a solvent, an Mn-containing precursor, a Ni-containing precursor, a Li-containing precursor and an M-containing precursor.

In some embodiments, one or more of the Mn-containing precursor, Ni-containing precursor, Li-containing precursor and (when present) M-containing precursor is soluble in the solvent. In some embodiments, one or more of the Mn-containing precursor, Ni-containing precursor, Li-containing precursor and (when present) M-containing precursor is insoluble in the solvent.

Herein, "soluble" indicates a solubility of at least 5 g/100 mL, for example at least 10 g/100 mL at 25° C. Herein, "insoluble" indicates a solubility of less than 0.10 g/100 mL, for example less than 0.05 g/100 mL, for example less than 0.02 g/100 mL at 25° C.

In some embodiments, one of the Mn-containing precursor, Ni-containing precursor, Li-containing precursor and (when present) M-containing precursor is soluble in the solvent. In some embodiments, the Li-containing precursor is soluble in the solvent and each of the Mn-containing precursor, Ni-containing precursor, and (when present) M-containing precursor are insoluble in the solvent.

In some embodiments, the first step (a) comprises providing a solution of Li-containing precursor, and adding an Mn-containing precursor, a Ni-containing precursor and optionally an M-containing precursor to the solution to prepare a slurry. In some embodiments, the solution is an aqueous solution. In some embodiments, each of the Mn-containing precursor, Ni-containing precursor, and (when present) M-containing precursor are insoluble in the solvent.

In some embodiments, the first step (a) comprises dissolving a Li-containing precursor in the solvent, and adding an Mn-containing precursor, a Ni-containing precursor and optionally an M-containing precursor to the solution to prepare a slurry. In some embodiments, each of the Mn-containing precursor, Ni-containing precursor, and (when present) M-containing precursor are insoluble in the solvent.

In some embodiments, the first step (a) further comprises stirring or agitating the solution/slurry during and/or after the addition of the precursors.

In some embodiments, the stirring or agitating of the slurry or solution may be carried out, for example, for a period of at least 10 minutes, at least 20 minutes, or at least 30 minutes. The period may be less than 5 hours, e.g. less than 2 hours.

In some embodiments, the first step (a) comprises dissolving a Li-containing precursor in the solvent, adding the Ni-containing precursor and (when present) the M-containing precursor to the solution, stirring or agitating the slurry, then adding the Mn-containing precursor and stirring or agitating the slurry again.

In some embodiments, the composition prepared in step (a) further comprises $H_3BO_3$. Without wishing to be bound by theory, $H_3BO_3$ is believed to support crystallisation during the synthesis and as a result a lower temperature may be used.

The Mn-containing precursor may be any compound of Mn which generates substantially no $NO_x$ products when calcined. In some embodiments, the Mn-containing precursor is insoluble in water at 25° C. In some embodiments, the Mn-containing precursor comprises or consists of one or more of $MnCO_3$, $MnO$ and $Mn_3O_4$. In some embodiments, the Mn-containing precursor comprises or consists of $MnCO_3$.

The Ni-containing precursor may be any compound of Ni which generates substantially no $NO_x$ products when calcined. In some embodiments, the Ni-containing precursor is insoluble in water at 25° C. In some embodiments, the Ni-containing precursor comprises or consists of one or more compounds selected from $Ni(OH)_2$, $NiO$, $NiO(OH)$, nickel sulfate, nickel acetate and hydrated forms thereof. In some embodiments, the Ni-containing precursor comprises or consists of $Ni(OH)_2$ or a hydrated form thereof.

The Li-containing precursor may be any compound of Li which generates substantially no $NO_x$ products when calcined. In some embodiments, the Li-containing precursor is soluble in water at 25° C. In some embodiments, the Li-containing precursor comprises or consists of one or more compounds selected from $LiOH$, $Li_2CO_3$ and hydrated forms thereof. In some embodiments, the Li-containing precursor comprises or consists of $LiOH$ or a hydrated form thereof.

The M-containing precursor may be any compound(s) of the element(s) M which generates substantially no $NO_x$ products when calcined. In some embodiments, the M-containing precursor is insoluble in water at 25° C. In some embodiments, the M-containing precursor comprises one or more compounds selected from M hydroxide, M oxide, M sulfate, M carbonate, M acetate and hydrated forms thereof. In some embodiments, the M-containing precursor comprises an Al-containing precursor. In some embodiments, the Al-containing precursor comprises or consists of one or more of $Al(OH)_3$ and $Al_2(SO_4)_3$. In some embodiments, the Al-containing precursor comprises or consists of $Al(OH)_3$.

In some embodiments, two or more of the Mn-containing precursor, Ni-containing precursor, and (when present) M-containing precursor may be provided as a single compound, for example a mixed metal hydroxide such as a mixed nickel manganese hydroxide.

$NO_x$ refers to one or both of the two gases nitrogen dioxide ($NO_2$) and nitric oxide ($NO$). The term "generates substantially no $NO_x$ gases" means that the calcination produces either no $NO_x$ gas product, or an amount of $NO_x$ gas product negligible enough that treatment of the exhaust gas to remove the $NO_x$ would not be required. For example, in some embodiments the amount of $NO_x$ produced during the calcination is such that the concentration of $NO_x$ in the exhaust gas from calcination is less than 50 ppm, for example less than 45 ppm, less than 40 ppm, less than 35 ppm, less than 30 ppm, less than 25 ppm, less than 20 ppm, less than 15 ppm, less than 10 ppm, less than 5 ppm or less than 1 ppm. In some embodiments the amount of $NO_x$ produced during the calcination is such that the concentration of $NO_x$ in the exhaust gas from calcination is less than 0.9 ppm, for example less than 0.8 ppm, less than 0.7 ppm, less than 0.6 ppm, less than 0.5 ppm, less than 0.2 ppm or less than 0.1 ppm, and in some embodiments about 0 ppm.

Suitable methods for detecting $NO_x$ and monitoring levels of $NO_x$ in exhaust gases from chemical processes are known to the skilled person and include gas-phase FTIR techniques and mass spectrometry. For example, the Antaris® IGS FTIR Analyzer from Thermo Scientific® may be used to monitor the levels of NO and $NO_2$ in the exhaust bases.

The skilled person is able to select suitable precursor compounds which generate substantially no $NO_x$ products when calcined. For example, the precursor compounds used in the process contain substantially no N-containing anions, since the presence of nitrate would generate $NO_x$ exhaust gas.

In particular, the precursor compounds used in the process contain substantially no nitrate, since the presence of nitrate would generate $NO_x$ exhaust gas. The term "substantially no nitrate" is intended to refer to a lack of nitrate while allowing for e.g. unavoidable nitrate present as impurities or trace amounts which would not generate substantial amounts of $NO_x$ and therefore would not necessitate exhaust gas treatment. In some embodiments, each precursor contains less than 10 wt % nitrate with respect to the weight of metal element in the precursor. For example, in some embodiments the Mn-containing precursor contains less than 10 wt % nitrate ($NO_3$) with respect to the amount of Mn in the precursor. For comparison, the compound $Mn(NO_3)_2$ would contain 225.7 wt % nitrate with respect to the amount of Mn in the compound.

In some embodiments, each precursor contains less than 5 wt % nitrate with respect to the weight of metal element in the precursor, for example less than 4 wt %, less than 3 wt %, less than 2 wt %, less than 1 wt %, less than 0.9 wt %, less than 0.5 wt % or less than 0.1 wt %.

In some embodiments, each precursor contains less than 5 wt % nitrogen atoms with respect to the weight of metal element in the precursor, for example less than 4 wt %, less than 3 wt %, less than 2 wt %, less than 1 wt %, less than 0.9 wt %, less than 0.5 wt % or less than 0.1 wt %. This includes nitrogen present in compounds such as nitrates, nitrites, nitrides and any organic nitrogen-containing species.

In some embodiments, the $D_{90}$ particle size of the Mn-containing precursor is at least 2.0 µm, for example at least 2.1 µm, at least 2.2 µm, at least 2.3 µm, at least 2.4 µm or at least 2.5 µm. In some embodiments, the $D_{90}$ particle size of the Mn-containing precursor is 120 µm or less, for example 119 µm or less, 118 µm or less, 117 µm or less, 116 µm or less, 115 µm or less or 114 µm or less.

In some embodiments, the $D_{90}$ particle size of the Mn-containing precursor is less than 4 µm. The inventors have found that the use of a Mn-containing precursor in the initial slurry which has a $D_{90}$ particle size of less than 4 µm provides a superior product with improved capacity and improved cyclability. The inventors have surprisingly found that this also provides a product with particularly high phase-purity, which is evident from analysis of XRD patterns for the material. In some embodiments, the $D_{90}$ particle size of the Mn-containing precursor is less than 3 µm, which provides particularly good results. In some embodiments, the $D_{90}$ particle size of the Mn-containing precursor is less than 2.9 µm, for example less than 2.8 µm, less than 2.7 µm, less than 2.6 µm, less than 2.5 µm, less than 2.4 µm, less than 2.3 µm, less than 2.2 µm, less than 2.1 µm or less than 2.2 µm.

In some embodiments, the $D_{90}$ particle size of the Mn-containing precursor is from about 2.0 µm to about 120 µm, for example from about 2.0 µm to about 115 µm, about 2.0 µm to about 100 µm, about 2.0 µm to about 50 µm, about 2.0 µm to about 20 µm, about 2.0 µm to about 15 µm or about 2.0 µm to about 10 µm. In some embodiments, the $D_{90}$ particle size of the Mn-containing precursor is from about 2.0 µm to about 4.0 µm, for example from about 2.0 µm to about 3.0 µm, 2.1 µm to about 3.0 µm, about 2.2 µm to about 3.0 µm, about 2.3 µm to about 3.0 µm, about 2.3 µm to about 2.9 µm, about 2.3 µm to about 2.8 µm, about 2.3 µm to about 2.7 µm, about 2.4 µm to about 2.6 µm, or about 2.5 µm.

In some embodiments, the $D_{50}$ particle size of the Mn-containing precursor is less than 2 µm, for example less than 1.9 µm, less than 1.8 µm, less than 1.7 µm, less than 1.6 µm or less than 1.5 µm. In some embodiments, the $D_{50}$ particle size of the Mn-containing precursor is at least 1.0 µm, for example at least 1.05 µm, at least 1.1 µm, at least 1.15 µm or at least 1.2 µm. In some embodiments, the $D_{50}$ particle size of the Mn-containing precursor is from about 1.0 µm to about 80 µm, for example from about 1.2 µm to about 75 µm, about 1.2 µm to about 70 µm, about 1.2 µm to about 65 µm, about 1.0 µm to about 50 µm, about 1.0 µm to about 20 µm or about 1.0 µm to about 5 µm. In some embodiments, the $D_{50}$ particle size of the Mn-containing precursor is from about 1.0 µm to about 2.0 µm, for example from about 1.0 µm to about 1.5 µm.

In some embodiments, the $D_{10}$ particle size of the Mn-containing precursor is less than 15 µm, for example less than 12 µm, less than 10 µm, less than 9 µm or less than 8 µm. In some embodiments, the $D_{10}$ particle size of the Mn-containing precursor is less than 2 µm, for example less than 1.5 µm, less than 1.4 µm, less than 1.3 µm, less than 1.2 µm, less than 1.1 µm or less than 1 µm. In some embodiments, the $D_{10}$ particle size of the Mn-containing precursor is at least 0.4 µm, for example at least 0.45 µm, at least 0.5 µm, at least 0.55 µm or at least 0.6 µm. In some embodiments, the $D_{10}$ particle size of the Mn-containing precursor is from about 0.4 µm to about 15 µm, for example from about 0.4 µm to about 12 µm, about 0.4 µm to about 10 µm, about 0.4 µm to about 9 µm, about 0.4 µm to about 8 µm, about 0.45 µm to about 8 µm, about 0.5 µm to about 8 µm, about 0.55 µm to about 8 µm or about 0.6 µm to about 8 µm. In some embodiments, the $D_{10}$ particle size of the Mn-containing precursor is from about 0.4 µm to about 2.0 µm, for example from about 0.5 µm to about 2.0 µm or from about 0.5 µm to about 1.0 µm.

In some embodiments, the Mn-containing precursor has a $D_{90}$ particle size of from about 2.0 µm to about 4.0 µm, a $D_{50}$ particle size of from about 1.0 µm to about 1.5 µm and a $D_{10}$ particle size of from about 0.5 µm to about 1.0 µm. In some embodiments, the Mn-containing precursor has a $D_{90}$ particle size of from about 2.0 µm to about 3.0 µm, a $D_{50}$ particle size of from about 1.0 µm to about 1.5 µm and a $D_{10}$ particle size of from about 0.5 µm to about 1.0 µm.

Mn-containing precursors having the preferred particle size distributions are commercially available, for example from Tropaq. Alternatively, the desired $D_{90}$ for the Mn-containing precursor may be obtained by milling a precursor of larger particle size until the correct particle size is reached, for example using milling equipment. The nature of the milling equipment is not particularly limited. For example, it may be a ball mill, a planetary ball mill, a rolling bed mill or a Pearl mill.

In some embodiments, the $D_{90}$ particle size of the Ni-containing precursor is less than 25 µm, for example less than 20 µm or less than 15 µm. In some embodiments, the $D_{90}$ particle size of the Ni-containing precursor is from 10 µm to 25 µm, for example from 10 µm to 20 µm, from 10 µm to 15 µm or from 12 µm to 14 µm. In some embodiments, the $D_{50}$ particle size of the Ni-containing precursor is less than 15 µm, for example less than 10 µm or less than 8 µm. In some embodiments, the $D_{50}$ particle size of the Ni-containing precursor is from 5 µm to 15 µm, for example from 5 µm to 12 µm, from 5 µm to 10 µm or from 5 µm to 8 µm. In some embodiments, the $D_{10}$ particle size of the Ni-containing precursor is less than 5 µm, for example less than 3 µm, less than 2 µm, less than 1 µm or less than 0.8 µm. In some embodiments, the $D_{10}$ particle size of the Ni-containing precursor is from 0.1 µm to 5 µm, for example from 0.2 µm to 5 µm, from 0.5 µm to 2 µm or from 0.5 µm to 1 µm.

In some embodiments, the $D_{90}$ particle size of the M-containing precursor (e.g. Al-containing precursor) is less than 200 µm, for example less than 190 µm, less than 180 µm, less than 170 µm or less than 160 µm. In some embodiments, the $D_{90}$ particle size of the M-containing precursor is from 120 µm to 200 µm, for example from 130 µm to 170 µm, from 140 µm to 160 µm or from 145 µm to 155 µm. In some embodiments, the $D_{50}$ particle size of the M-containing precursor is less than 120 µm, for example less than 115 µm, less than 110 µm, less than 105 µm, less than 100 µm, less than 95 µm or less than 90 µm. In some embodiments, the $D_{50}$ particle size of the M-containing precursor is from 50 µm to 120 µm, for example from 60 µm to 100 µm, from 60 µm to 90 µm or from 80 µm to 90 µm. In some embodiments, the $D_{10}$ particle size of the M-containing precursor is less than 60 µm, for example less than 55 µm, less than 50 µm or less than 45 µm. In some embodiments, the $D_{10}$ particle size of the M-containing precursor is from 30 µm to 55 µm, for example from 35 µm to 55 µm, from 35 µm to 50 µm or from 40 µm to 45 µm.

In step (b) of the process the composition which is prepared in step (a) is subjected to milling. Any suitable milling equipment known to the skilled person may be used. The nature of the milling equipment is not particularly limited. For example, it may be a ball mill, a planetary ball mill, a rolling bed mill or a Pearl mill. The milling may be carried out until the particles reach the desired size. For example, the composition is typically milled until the particles have a $D_{50}$ particle size of less than 50 µm, e.g. less than 40 µm, less than 30 µm or less than 20 µm.

The use of such a milling step means that precursors of larger particle size may be used in the process with little or no negative impact on the structure or properties of the product. This makes the process more economical and more easily scalable, since larger particle size precursors are less expensive.

Thus in some embodiments, the process comprises
  (a) preparing a composition comprising an Mn-containing precursor, a Ni-containing precursor, a Li-containing precursor and optionally an M-containing precursor, wherein a single compound may optionally contain two or more of Mn, Ni and M;
  (b) milling the composition; and
  (c) calcining the product of step (b);
  wherein M is one or more elements selected from Al, Mg, Ti, Co, Cu and Cr;
  wherein the Mn-containing precursor, Ni-containing precursor, Li-containing precursor and optional M-containing precursor are selected such that substantially no $NO_x$ gases are formed during the calcination in step (c);
  and wherein the Mn-containing precursor has a D90 particle size of at least 10 µm, for example at least 20 µm, at least 30 µm, at least 40 µm, at least 50 µm, at least 60 µm, at least 70 µm, at least 80 µm, at least 90 µm, at least 100 µm or at least 110 µm. In some embodiments, the Mn-containing precursor has a D10 particle size of at least 2 µm (for example at least 5 µm), a $D_{50}$ particle size of at least 10 µm (for example at least 50 µm) and D90 particle size of at least 10 µm (for example at least 80 µm). In this way, a more economical process of preparing a high-quality product is provided.

In some embodiments the composition is a slurry and the slurry is subjected to milling in step (b).

In some embodiments, the composition is milled in a Pearl mill. This provides the advantage that the composition is in a circular flow and so is milled several times.

In some embodiments, the milling comprises milling in the presence of inert grinding media, for example grinding beads.

In some embodiments, grinding beads used in the mill comprise zirconium oxide ($ZrO_2$).

In some embodiments, the grinding beads have a diameter of less than 1 mm, for example less than 0.9 mm, less than 0.8 mm or less than 0.7 mm. In some embodiments, 0.6 mm $ZrO_2$ grinding beads are used.

In some embodiments, the milling is carried out for at least 30 mins, for example at least 45 mins, at least 60 mins, at least 75 mins, at least 90 mins or at least 105 mins. In some embodiments, the milling is carried out for up to 5 hrs, for example up to 4.5 hrs, up to 4 hrs, up to 3.5 hrs, up to 3 hrs, or up to 2.5 hrs.

In some embodiments, the milling is carried out for at least 2 hours. Such increased milling time allows a precursor of larger particle size to be used without jeopardising the product structure or properties, which as explained above provides a more economical process.

In some embodiments the slurry when added to the mill has a solids content of at least 10 wt %, for example at least 15 wt %, at least 20 wt %, at least 25 wt %, at least 30 wt %, at least 35 wt % or at least 40 wt %. In some embodiments the slurry when added to the mill has a solids content of up to 80 wt %, for example up to 75 wt %, up to 70 wt %, up to 65 wt %, up to 60 wt %, up to 55 wt % or up to 50 wt %. In some embodiments the slurry when added to the mill has a solids content of 10-80 wt %, for example 10-70 wt %, 20-70 wt %, 30-70 wt %, 30-60 wt %, 40-60 wt % or 40-50 wt %.

In some embodiments, the milling speed during step (b) is at least 1000 rpm, for example at least 1500 rpm, at least 2000 rpm or at least 2500 rpm. In some embodiments, the milling speed is about 3000 rpm.

When the composition which is subjected to milling comprises a solvent (i.e. when the composition is a slurry), after the milling in step (b), the milled slurry is dried.

Any suitable drying method known to the skilled person may be used, but preferably the slurry is spray-dried. This makes the drying step easier to scale up.

Other possible drying methods include drying the slurry in a heated vacuum oven.

In some embodiments, the slurry is spray-dried at a temperature of at least 150° C., for example at least 160° C., at least 170° C., at least 180° C., at least 190° C., at least 200° C. or at least 210° C. In some embodiments, the slurry is spray-dried at a temperature of up to 280° C., for example up to 270° C., up to 260° C., up to 250° C., up to 240° C. or up to 230° C. In some embodiments, the slurry is spray-dried at a temperature of 150-280° C., for example 160-270° C., 170-270° C., 180-270° C., 180-260° C., 180-250° C., 190-250° C., 190-240° C., 200-240° C., 200-230° C. or 210-230° C.

The skilled person will understand that the temperature selection will depend upon the scale of the spray drying process, with higher temperatures being possible for larger-scale processes (e.g. up to about 400° C.).

In some embodiments, the outlet temperature of the nozzle during the spray drying method is maintained at a temperature of from 80-130° C., for example 80-120° C., 90-120° C. or 100-120° C. As will be understood by the skilled person, the outlet temperature can be adjusted by adjustment of the pump speed.

The product of the drying step is a dry material which is then calcined in step (c).

Calcination of the composition is carried out in step (c).

In some embodiments, during calcination the material is exposed to a temperature of at least 350° C., for example at least 360° C., at least 370° C., at least 380° C., at least 390° C., at least 400° C., at least 410° C., at least 420° C., at least 430° C. or at least 440° C. for at least part of the calcination. In some embodiments, at least part of the calcination is carried out at a temperature of at least 750° C., for example at least 760° C., at least 770° C., at least 780° C., at least 790° C., at least 800° C., at least 810° C., at least 820° C., at least 830° C. or at least 840° C.

In some embodiments, for at least part of the calcination the material is exposed to a temperature of 350-950° C., for example 400-900° C., 440-860° C., 750-950° C., 760-940° C., 770-930° C., 780-920° C., 790-910° C., 800-900° C., 810-890° C., 820-880° C., 830-870° C. or 840-860° C. In some embodiments, for at least part of the calcination the material is exposed to a temperature of about 850° C. In some embodiments, for at least part of the calcination the material is exposed to a temperature of about 450° C.

In some embodiments, calcination is performed by heating the material up from ambient temperature $T_0$ to a temperature $T_1$ (over a period of ramping time $t_{0-1}$) and holding the material at $T_1$ for a period of time $t_1$. In some embodiments, $T_1$ is a temperature of 350-950° C., for example 400-900° C., 440-860° C., 750-950° C., 760-940° C., 770-930° C., 780-920° C., 790-910° C., 800-900° C., 810-890° C., 820-880° C., 830-870° C. or 840-860° C. In some embodiments, $T_1$ is a temperature of about 850° C. $T_0$ may be around room temperature.

In some embodiments, $t_1$ is at least 10 mins, for example at least 20 mins, at least 30 mins, at least 40 mins or at least 50 mins. In some embodiments, $t_1$ is up to 15 hrs, for example up to 14.5 hrs, up to 14 hrs, up to 13.5 hrs, up to 13 hrs, up to 12.5 hrs or up to 12 hrs. In some embodiments, $t_1$ is from 20 mins to 15 hrs, for example 1 hr to 15 hrs, 5 hrs to 15 hrs or 8 mins to 13 hrs. In some embodiments, $t_1$ is about 12 hrs.

In some embodiments, $t_{0-1}$ is from about 1 to 10 hrs, for example from about 2 to 8 hrs, about 2 to 6 hrs, about 3 to 6 hrs or about 5 hrs.

Calcination may be performed in any suitable calciner, and non-limiting examples include a furnace, such as a batch furnace.

After calcination the material may be left to cool at ambient temperature.

The calcination step may be carried out in air. In other embodiments the calcination step may be carried out under a $CO_2$-free atmosphere. For example, $CO_2$-free air may be flowed over the materials to be calcined during calcination and optionally during cooling. The $CO_2$-free air may, for example, be a mix of oxygen and nitrogen. The $CO_2$-free atmosphere may be oxygen (e.g. pure oxygen). Preferably, the atmosphere is an oxidising atmosphere. As used herein, the term "$CO_2$-free" is intended to include atmospheres including less than 100 ppm $CO_2$, e.g. less than 50 ppm $CO_2$, less than 20 ppm $CO_2$ or less than 10 ppm $CO_2$. These $CO_2$ levels may be achieved by using a $CO_2$ scrubber to remove $CO_2$.

In some embodiments, the method further comprises a step (d) after calcination of deagglomerating the calcined material. In some embodiments, this comprises low-energy milling.

In some embodiments, the method further comprises a step of sieving the material. In some embodiments, the method further comprises deagglomeration followed by sieving. In some embodiments, the a sieve with an aperture size less than 60 μm is used, for example less than 55 μm or less than 50 μm.

The process of the present invention may further comprise the step of forming an electrode (typically a cathode) comprising the lithium manganese nickel spinel compound. Typically, this is carried out by forming a slurry of the particulate lithium manganese spinel compound, applying the slurry to the surface of a current collector (e.g. an aluminium current collector), and optionally processing (e.g. calendaring) to increase the density of the electrode. The slurry may comprise one or more of a solvent, a binder, carbon material and further additives.

Typically, the electrode of the present invention will have an electrode density of at least 2.5 g/cm³, at least 2.8 g/cm³ or at least 3 g/cm³. It may have an electrode density of 4.5 g/cm³ or less, or 4 g/cm³ or less. The electrode density is the electrode density (mass/volume) of the electrode, not including the current collector the electrode is formed on. It therefore includes contributions from the active material, any additives, any additional carbon material, and any remaining binder.

The process of the present invention may further comprise constructing a battery or electrochemical cell including the electrode comprising the lithium nickel oxide. The battery or cell typically further comprises an anode and an electrolyte. The battery or cell may typically be a secondary (rechargeable) lithium (e.g. lithium ion) battery.

A second aspect of the invention is a lithium manganese nickel spinel compound obtained or obtainable by a process according to the first aspect.

The lithium manganese spinel compound is characterised by high initial capacity and high capacity retention. In some embodiments, the compound retains at least 92% capacity after 200 cycles at 23° C., a discharge rate of C/2 and an electrode loading of 6 mg/cm², for example at least 92.5%, at least 93%, at least 93.5%, at least 94%, at least 94.5%, at least 95% or at least 95.5%.

In some embodiments, the compound provides an initial capacity of at least 125 mAh/g, for example at least 126 mAh/g, at least 127 mAh/g, at least 128 mAh/g, at least 129 mAh/g, at least 130 mAh/g, at least 131 mAh/g, at least 132 mAh/g, at least 133 mAh/g, at least 134 mAh/g or at least 135 mAh/g.

A third aspect of the invention provides a positive active electrode material comprising the compound according to the second aspect.

A fourth aspect of the invention provides an electrode comprising the material according to the third aspect.

A fifth aspect of the invention provides a lithium secondary battery comprising the electrode according to the fourth aspect.

Another aspect of the invention is the use of a compound according to the second aspect in a lithium secondary cell or battery.

The present invention will now be described with reference to the following examples, which are provided to assist with understanding the present invention, and are not intended to limit its scope.

EXAMPLES

Example 1—Preparation of $LiMn_{1.55}Ni_{0.4}Al_{0.05}O_4$ from Hydroxide and Carbonate Precursors 58.4 g of $LiOH \cdot H_2O$ (SQM) was dissolved in 250 mL of $H_2O \cdot Ni(OH)_2$ (Todini GmbH, D50=5.9 µm) and $Al(OH)_3$ (Clariant; D90=152.77 µm, D50=87.63 µm, D10=43.29 µm) were added along with an additional 50 mL of $H_2O$, and the slurry was mixed at 3000 rpm using an Ultra Turrax disperser for 30 mins.

Figure 8:
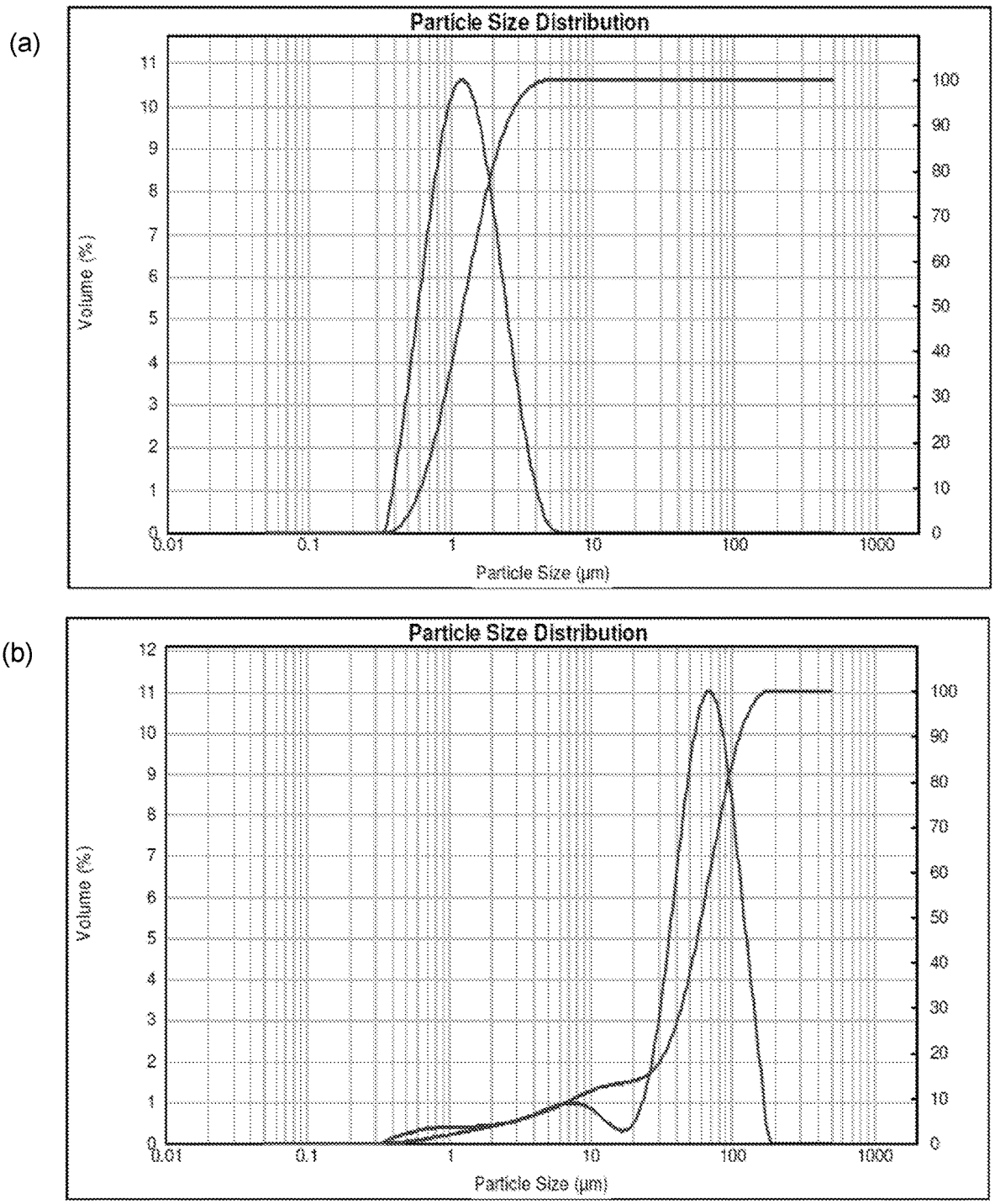
FIG. 8 shows (a) a particle size distribution for a first $MnCO_3$ powder used as a precursor, and (b) a particle size distribution for a second $MnCO_3$ powder used as a precursor.

$MnCO_3$ with a D90 particle size of 2.5 µm, a D50 particle size of 1.23 µm and a D10 particle size of 0.62 µm (Tropaq UF, Clariant) was added and the slurry was mixed for a further 20 mins at 6000 rpm. A particle size distribution of the $MnCO_3$ powder is shown in FIG. 8(a).

1.14 g of $H_3BO_3$ and 2.3 g of LiOH were then thoroughly mixed in a pestle and mortar and added to the slurry with an additional 300 mL of $H_2O$.

The slurry was then milled in a pearl mill for 2 hours. The chamber was 80% filled with 0.6 mm $ZrO_2$ balls, and the slurry had a solids content of 42 wt %. The mill speed was 3000 rpm and the pump speed was 2500 rpm.

After milling the slurry was spray-dried using a Buchi lab spray dryer at 220° C. whilst the pump speed was adjusted to maintain the outlet temperature at 110° C. Subsequently the collected powder was calcined in air by heating up to 850° C. over 5 hours, then holding at 850° C. for 12 hours, using a batch furnace from Nabertherm. After calcination the powder was removed from the furnace and allowed to cool at ambient temperature. The powder was then gently milled in a Fritsch mill to de-agglomerate and passed through a 45 µm sieve.

The product, denoted "Sample A" herein, was found to have a D50 particle size of 5.68 µm. A typical particle size distribution is shown in FIG. 9(a).

Figure 9:
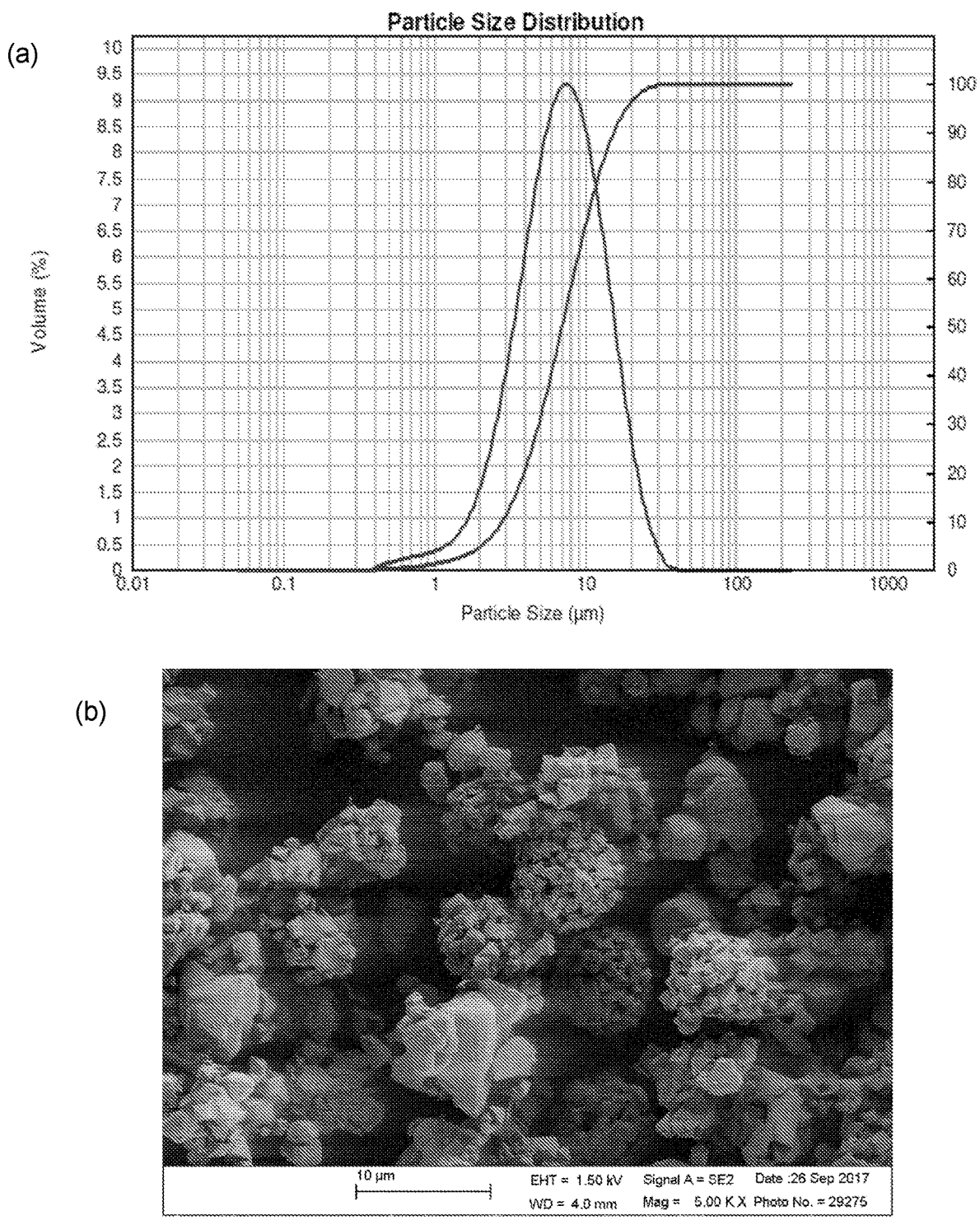
FIG. 9 shows (a) a particle size distribution for a lithium manganese nickel spinel material (Sample A) prepared by a process of the invention, and (b) an SEM image of the lithium manganese nickel spinel material (Sample A) prepared by a process of the invention.
Figure 10:
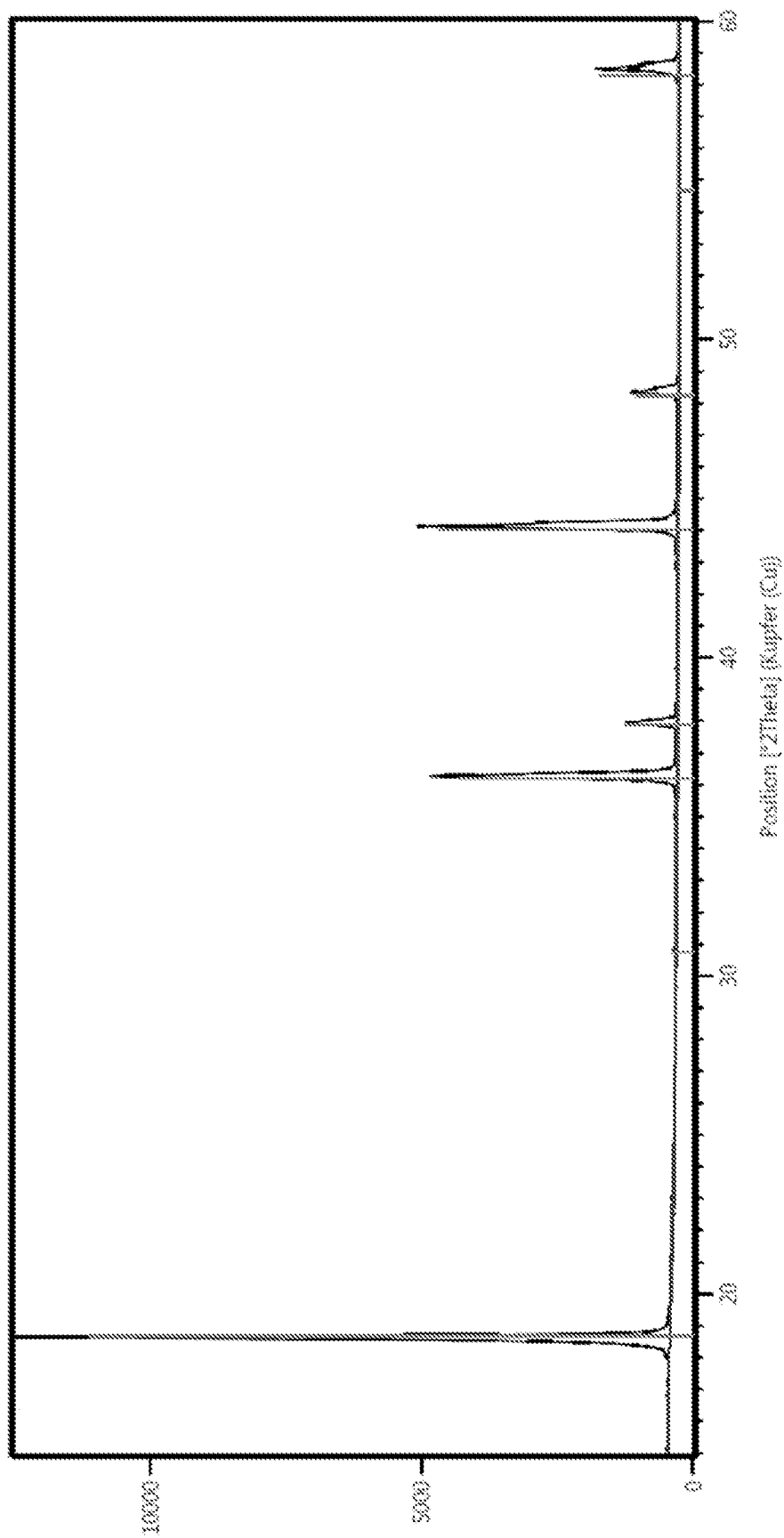
FIG. 10 shows an XRD scan for a lithium manganese nickel spinel material (Sample A) prepared by a process of the invention.

FIG. 9(b) shows an SEM image of the lithium manganese nickel spinel material prepared in Example 1. FIG. 10 shows an XRD plot of the material.

Example 2—Preparation of $LiMn_{1.55}Ni_{0.4}Al_{0.05}O_4$ from Hydroxide and Carbonate Precursors The method of Example 1 was carried out except that the $MnCO_3$ precursor used had a D90 particle size of 113.6 µm, a D50 particle size of 60.61 µm and a D10 particle size of 7.84 µm (Tropaq HP, Clariant). A particle size distribution of the $MnCO_3$ powder is shown in FIG. 8(b). The product is denoted "Sample B" herein.

Comparative Example 1—Preparation of $LiMn_{1.55}Ni_{0.4}Al_{0.05}O_4$ from Nitrate and Carbonate Precursors $Mn(NO_3)_2 \cdot 4H_2O$, $Ni(NO_3)_2 \cdot 6H_2O$ and $Al(NO_3)_3 \cdot 9H_2O$ were dissolved in deionised water using an Ultra Turrax mixer for 30 minutes. Separately, $LiOH \cdot H_2O$ was dissolved in deionised water with $H_3BO_3$. Subsequently the $LiOH/H_3BO_3$ solution was added dropwise to the mixed metal nitrate solution. The suspensions were mixed with the Ultra Turrax mixer for 10 minutes and then 60 minutes in a Pendraulik mixer.

$MnCO_3$ with a D90 particle size of 2.5 µm, a D50 particle size of 1.23 µm and a D10 particle size of 0.62 µm (Tropaq UF) was added and the suspension which was then mixed for a further hour. The suspension was then milled in a bead mill for 1 hour. The grinding chamber was filled 75% with 1.3 mm $ZrO_2$ balls and the solids content of the suspension was 50%. The milling was conducted over 3×20 minute periods with 20 minutes' rest between each milling period.

The milled suspension was spray-dried at 220° C., the pump rate was maintained to keep the outlet temperature around 110° C. Subsequently the collected powder was calcined in air at 450° C. for 1 hour and then 12 hours at 850° C. After calcination the powder was gently milled to de-agglomerate and passed through a 45 µm sieve.

The product, denoted "Sample C" herein, was found to have a D90 particle size of 11.01 µm, a D50 particle size of 4.79 µm and a D10 particle size of 1.68 µm.

Comparative Example 2—Preparation of $LiMn_{1.55}Ni_{0.4}Al_{0.05}O_4$ from Nitrate and Carbonate Precursors The method of Comparative Example 1 was carried out except that the $MnCO_3$ precursor used had a D90 particle size of 113.6 µm, a D50 particle size of 60.61 µm and a D10 particle size of 7.84 µm (Tropaq HP).

The product, denoted "Sample D" herein, was found to have a D90 particle size of 13.50 µm, a D50 particle size of 5.65 µm and a D10 particle size of 2.13 µm.

Comparative Example 3—Preparation of $LiMn_{1.55}Ni_{0.4}Al_{0.05}O_4$ from Nitrate and Carbonate Precursors The method of Comparative Example 1 was carried out except that the $MnCO_3$ precursor used had a D90 particle size of 113.6 µm, a D50 particle size of 60.61 µm and a D10 particle size of 7.84 µm (Tropaq HP). Furthermore, after the addition of the $MnCO_3$, the milling in the bead mill was carried out for 4 hours instead of 1 hour.

The product, denoted "Sample E" herein, was found to have a D90 particle size of 12.73 µm, a D50 particle size of 5.98 µm and a D10 particle size of 2.47 µm.

Comparative Example 4—Preparation of $LiMn_{1.55}Ni_{0.4}Al_{0.05}O_4$ from Nitrate and Carbonate Precursors $Mn(NO_3)_2 \cdot 4H_2O$, $Ni(NO_3)_2 \cdot 6H_2O$ and $Al(NO_3)_3 \cdot 9H_2O$ were dissolved in deionised water using an Ultra Turrax mixer for 30 minutes. Separately, $LiOH \cdot H_2O$ was dissolved in deionised water with $H_3BO_3$. Subsequently the $LiOH/H_3BO_3$ solution was added dropwise to the mixed metal nitrate solution. The suspensions were mixed with the Ultra Turrax mixer for 10 minutes and then 60 minutes in a Pendraulik mixer.

Figure 12:
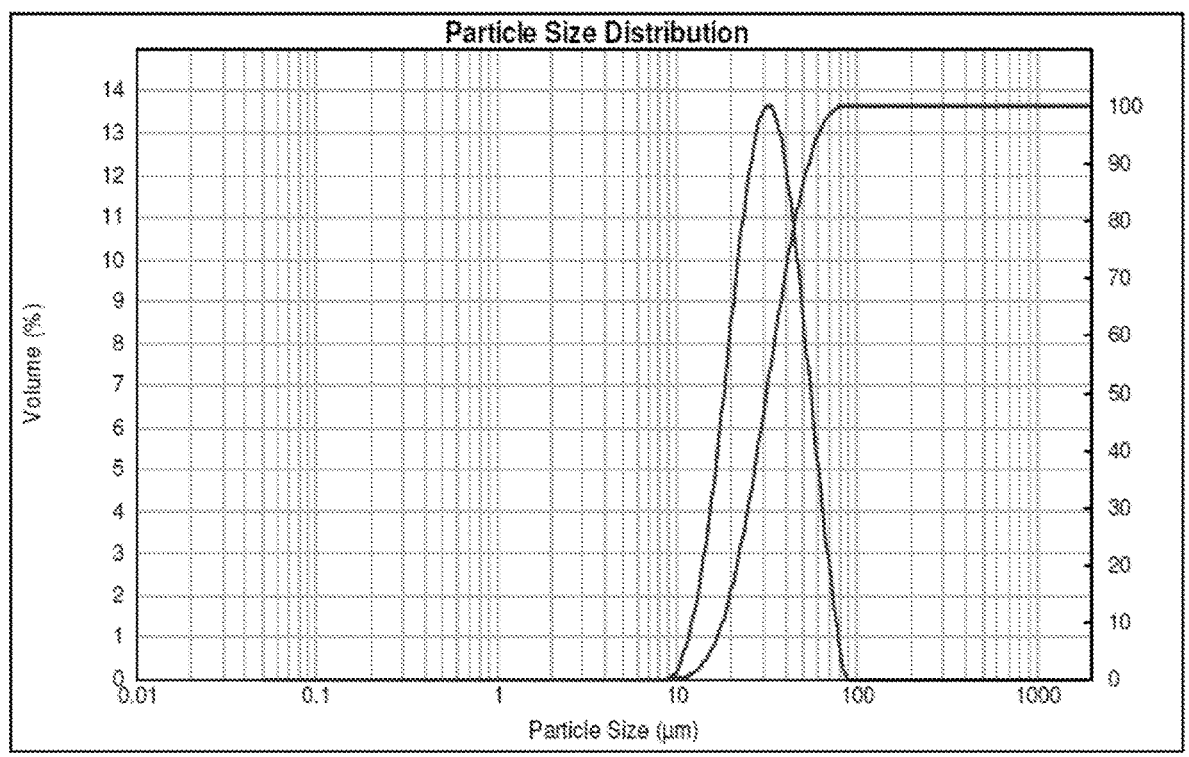
FIG. 12 shows a particle size distribution for a $MnCO_3$ powder used as a precursor in Comparative Example 4.

$MnCO_3$ with a D90 particle size of 54.17 µm, a D50 particle size of 31.74 µm and a D10 particle size of 18.07 µm (Tropaq Type N) was added and the suspension which was then mixed for a further hour. The suspension was not subjected to any milling or grinding. A PSD for the Tropaq Type N $MnCO_3$ is provided in FIG. 12.

The suspension was spray-dried at 220° C., the pump rate was maintained to keep the outlet temperature around 110° C. Subsequently the collected powder was calcined in air at 450° C. for 1 hour and then 12 hours at 850° C. After calcination the powder was gently milled to de-agglomerate and passed through a 45 µm sieve. The product is denoted "Sample F" herein.

Electrochemical Testing

Electrodes were made in a 90:5:5 active:carbon:binder formulation with an ink at 40% solids. A 10 wt % solution of polyvinylidene fluoride (PVdF; Solvay Solexis Solef 5130) in N-methyl pyrollidone (NMP; ex Aldrich) was prepared. A 2 g extract of this solution was taken and 3.5 g of NMP was added. 0.2 g carbon black (Timcal, Super P Li) was added and the composition was mixed for 1 hour at 4000 rpm with a tube drive. 3.6 g of active material as prepared in the above examples and comparative examples was added and further mixed for 1 hour at 4000 rpm with a tube drive.

The resulting ink was cast onto aluminium foils using a fixed blade coater to provide a foil coated on both sides with a wet thickness of 170 μm. The foil was pre-dried at 50° C. on a heating plate and then dried for 120 minutes at 120° C. under vacuum. Once dry, the electrode sheet was cut into electrodes of 13 mm diameter (1.33 $cm^2$ area) and further dried in vacuum overnight at 160° C. The electrodes were then compacted at a static pressure of 10 t/$cm^2$ for two 1-minute periods. The thickness of the dried and pressed electrodes was 45 μm, with a typical loading of active material from 5-10 mg/$cm^2$.

Testing was performed in half-cells with a 15 mm lithium foil disk as a counter electrode, PSI glass fibre separator and 0.4 mL electrolyte made up of fluorinated ethylene carbonate (FEC):DMC in a 1:4 volume ratio. Galvanostatic cycling tests were performed by cycling the cell at C/2 between 3.0 V and 5.1 V vs. Li/$Li^+$.

The specific capacity of three different materials is plotted against discharge rate in FIG. 1. The plot shows the specific capacities of the materials prepared in Comparative Examples 1, 2 and 3 (Samples C, D and E respectively). The plot shows that to match the capacity and rate performance of the material of Comparative Example 1 (prepared from an Mn precursor of smaller particle size), it is necessary to increase the milling time from 1 hour to 4 hours when a larger Mn precursor particle size is used. In other words, 4 hours of milling was required to achieve the same degree of homogeneity in the material prepared from an Mn precursor of larger particle size.

Figure 2:
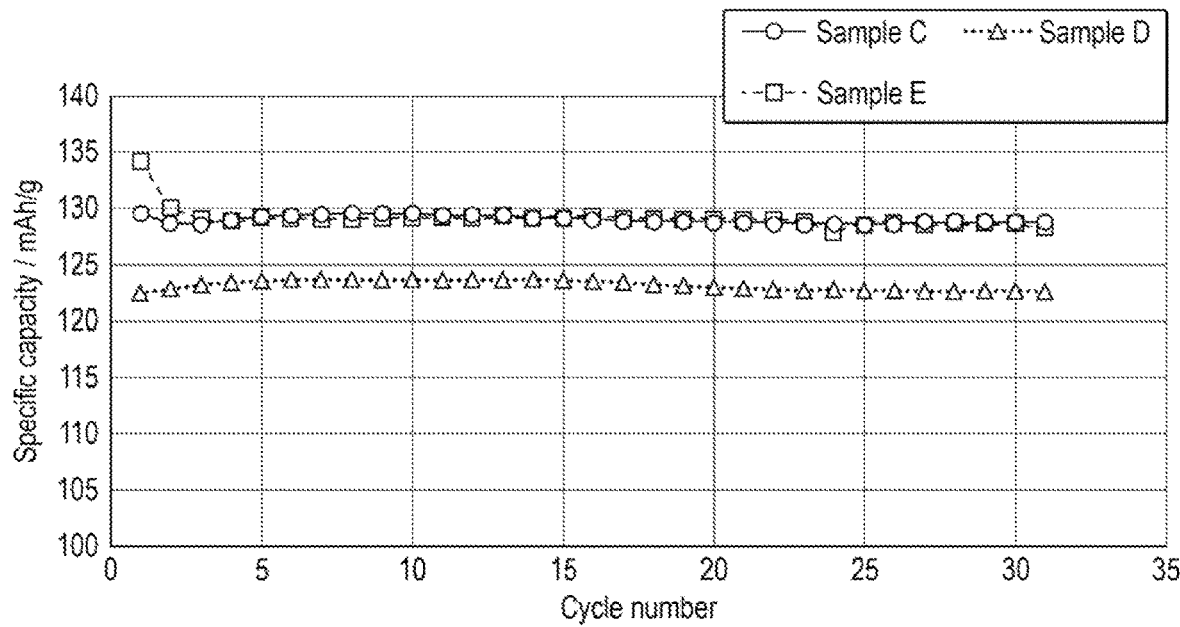
FIG. 2 shows the specific capacity of three comparative materials (Samples C, D and E) plotted against the number of discharge cycles.

FIG. 2 is a plot of the cycle life for the materials of Comparative Examples 1, 2 and 3 (Samples C, D and E respectively). The results show that to match the cycle life of the material of Comparative Example 1 (prepared from an Mn precursor of smaller particle size), it is necessary to increase the milling time from 1 hour to 4 hours when a larger Mn precursor particle size is used.

Figure 3:
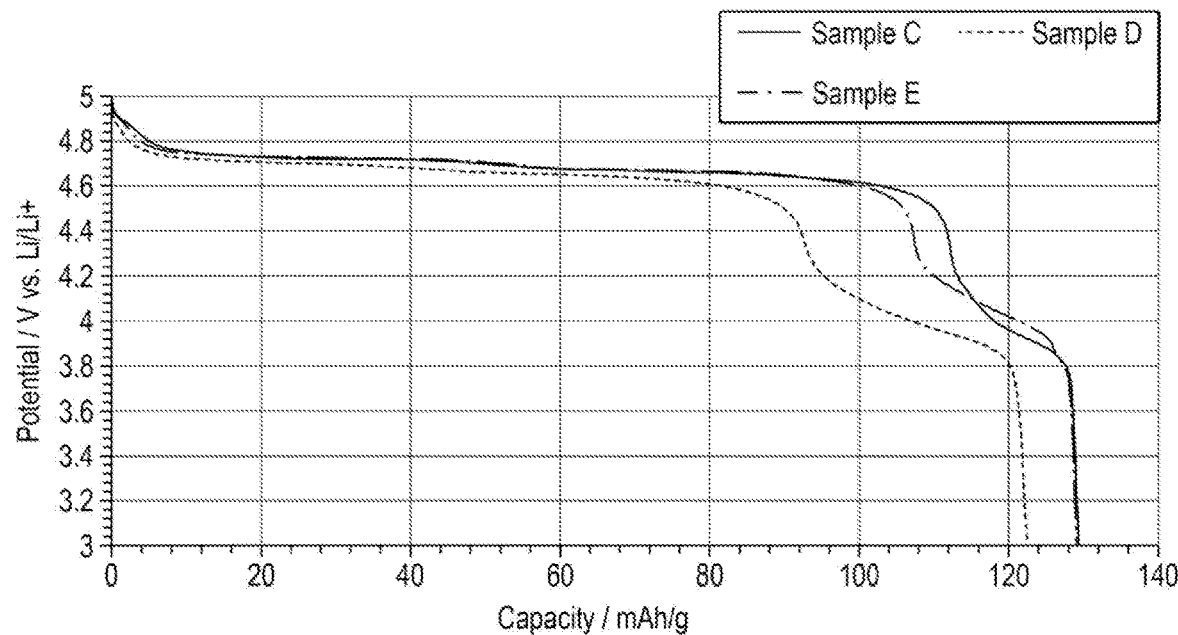
FIG. 3 is a plot of the discharge potential curves for three comparative materials (Samples C, D and E).

FIG. 3 shows discharge curves for the materials of Comparative Examples 1, 2 and 3 (Samples C, D and E respectively). The results show that the materials of Comparative Examples 1 and 3 have comparable specific energy, while the specific energy of the material of Comparative Example 2 is lower, which corresponds with the results shown in FIGS. 1 and 2. FIG. 3 also shows that the Mn(III) plateau at 4.0 V is longer for Comparative Examples 2 and 3 than for Comparative Example 1, indicating that the Mn precursor in Comparative Examples 2 and 3 was partially oxidised during the manufacturing process.

Figure 4:
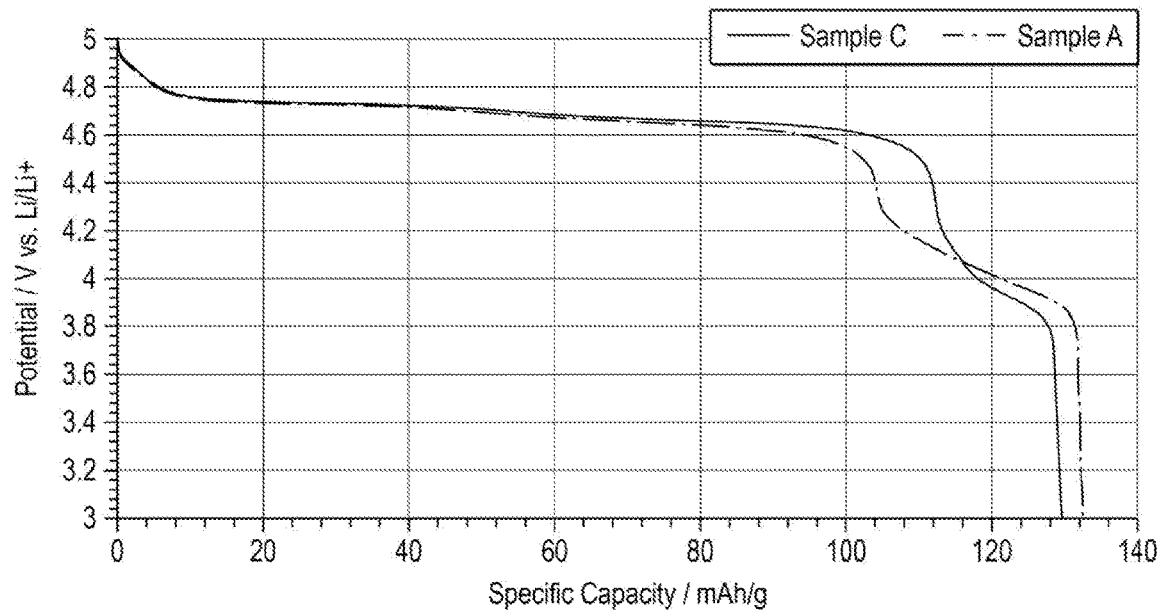
FIG. 4 is a plot of the discharge potential curves for a material made according to the inventive process (Sample A) and a comparative material (Sample C).

FIG. 4 plots the specific capacities of the materials of Example 1 and Comparative Example 1 (Samples A and C respectively). The results show that the capacity of the Example 1 material is higher than the Comparative Example 1 material.

Figure 5:
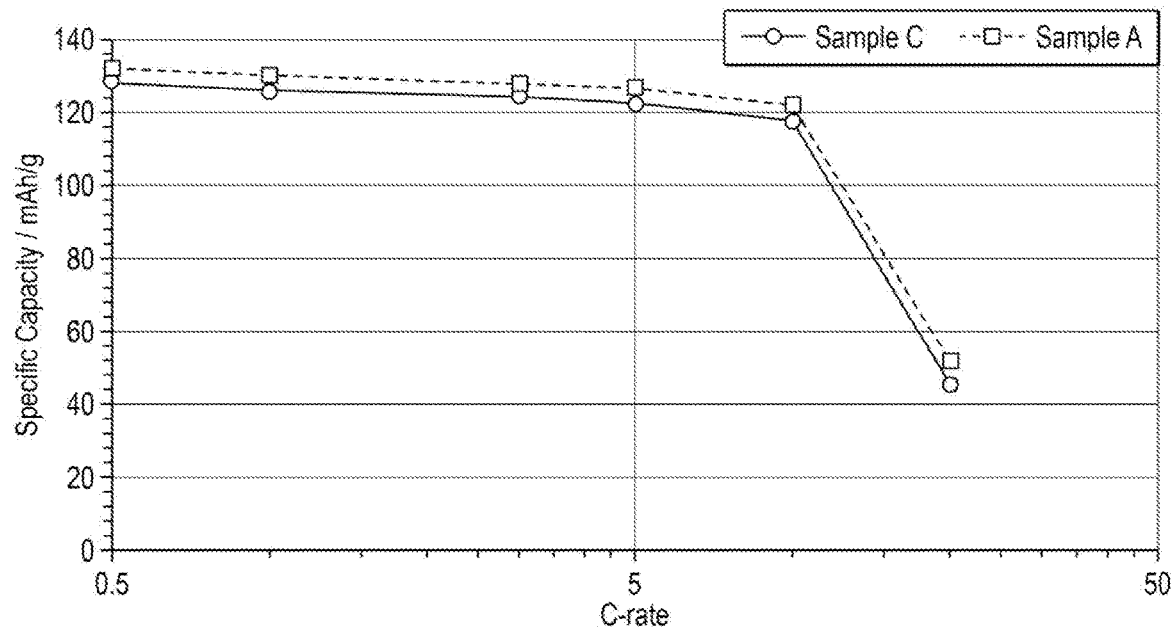
FIG. 5 is a plot of the specific capacity of a material made according to the inventive process (Sample A) and a comparative material (Sample C) at various discharge rates ("C-rates").
Figure 6:
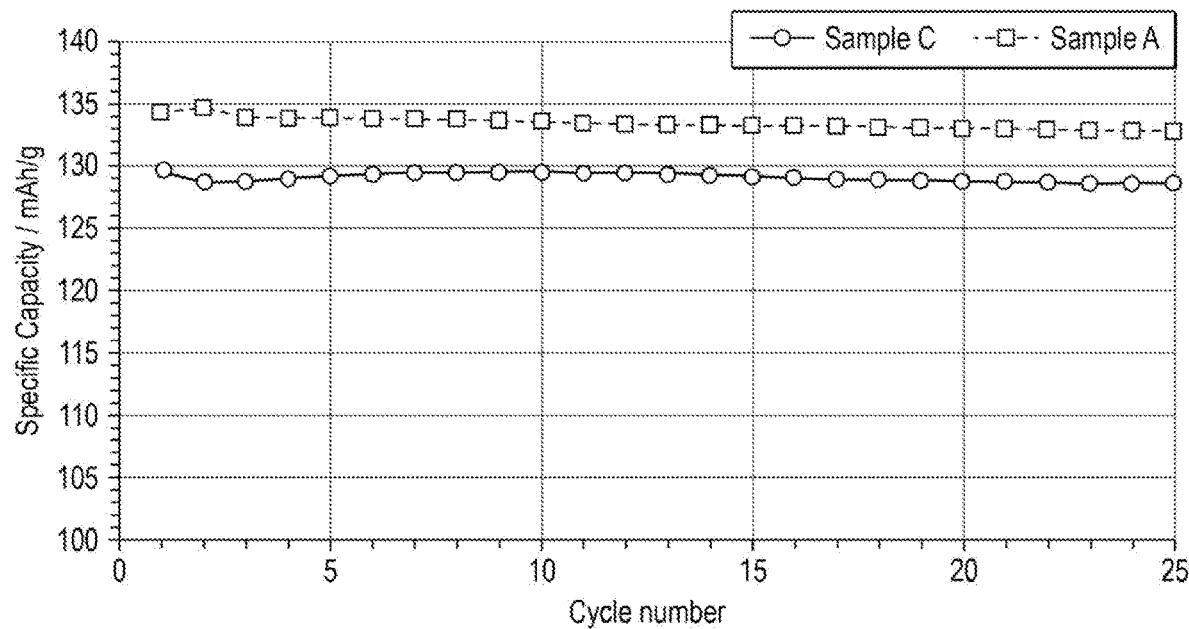
FIG. 6 shows the specific capacity of a material made according to the inventive process (Sample A) and a comparative material (Sample C) plotted against the number of discharge cycles.

FIG. 5 shows that the rate capabilities of the Example 1 and Comparative Example 1 materials (Samples A and C respectively) were comparable. No difference in life cycle performance is evident from the results shown in FIG. 6 over the duration of the test (25 cycles).

It is therefore possible to obtain a phase pure material, with a similar particle size, higher capacity and comparable rate capability and cycle life with the processes of the invention relative to existing processes which use nitrate precursors. In addition to this, no $NO_x$ gases are produced and therefore no exhaust gas treatment is necessary.

Figure 7:
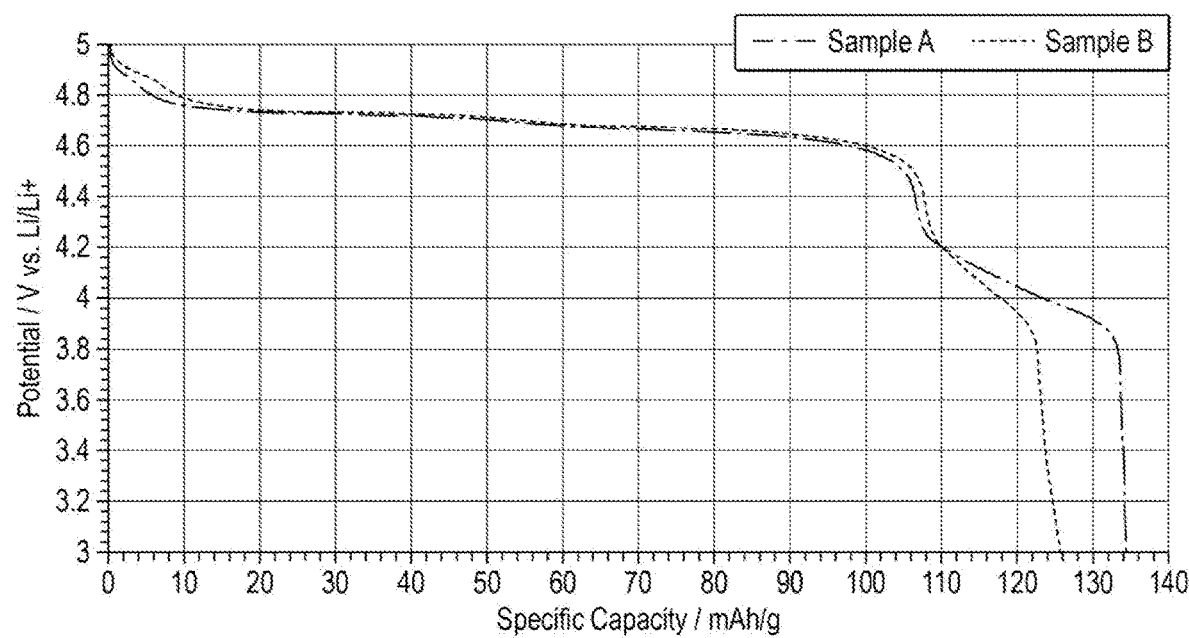
FIG. 7 is a plot of the discharge potential curves for two different materials made according to the inventive process (Samples A and B).

FIG. 7 shows the specific capacities of the materials of Example 1 and Example 2 (Samples A and B respectively).

XRD indicated that a single phase was formed in both Examples 1 and 2, with a comparable lattice parameter. This suggests that the same amount of Ni and Al was incorporated into the lattice despite the change in precursor. However the results in FIG. 7 show that the material of Example 2, made using the larger $MnCO_3$ precursor, has a lower capacity (128 mAh/g) than that of Example 1 (134 mAh/g). This may be due to some oxidation of Mn(II) to Mn(III) during the manufacture of the Example 2 product.

Figure 11:
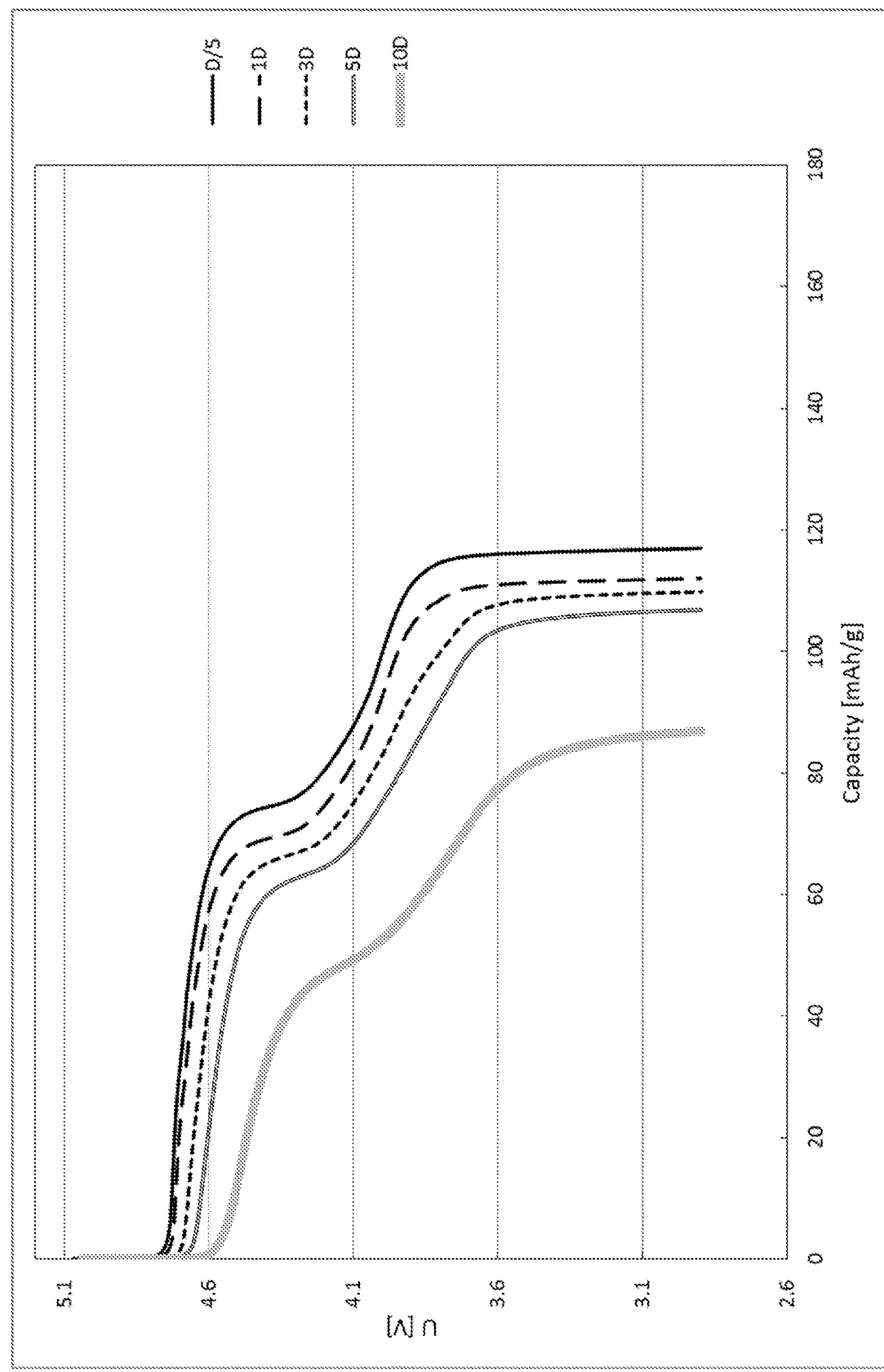
FIG. 11 shows discharge curves for a lithium manganese nickel spinel material (Sample F) at various discharge rates.

FIG. 11 shows discharge curves for the material of Comparative Example 4 at five different discharge rates: D/5 (5 hours), 1D (1 hour), 3D (20 mins), 5D (12 mins) and 10D (6 mins). Relative to the inventive materials, the discharge curves in FIG. 11 show relatively low specific capacity even at low discharge rates and a short high-volt plateau indicating a lower specific energy.

The invention claimed is:

1. A process for the preparation of a particulate lithium manganese nickel spinel compound, the process comprising:
    (a) milling a composition comprising a Mn-containing precursor, a Ni-containing precursor and a Li-containing precursor, wherein the Mn-containing precursor before milling has a $D_{90}$ particle size of from about 2.0 μm to about 4.0 μm; and
    (b) calcining the product of step (a);
    wherein substantially no $NO_x$ gases are formed during the calcination in step (b) beyond impurities or trace amounts obviating the need for exhaust gas treatment, wherein $NO_x$ gases comprise NO, $NO_2$ or a mixture thereof.

2. The process according to claim 1, wherein the amount of $NO_x$ produced during the calcination is such that the concentration of $NO_x$ in the exhaust gas from calcination is less than 50 ppm.

3. The process according to claim 1, wherein the $D_{90}$ particle size of the Mn-containing precursor is 2 μm to 3 μm; and/or
    wherein the $D_{50}$ particle size of the Mn-containing precursor is less than 2 μm; and/or
    wherein the $D_{10}$ particle size of the Mn-containing precursor is less than 1 μm.

4. The process according to claim 1, wherein the Mn-containing precursor has a $D_{90}$ particle size of from about 2.0 μm to about 4.0 μm, a $D_{50}$ particle size of from about 1.0 μm to about 1.5 μm and a $D_{10}$ particle size of from about 0.5 μm to about 1.0 μm.

5. The process according to claim 1, wherein the particulate lithium manganese nickel spinel compound has a $D_{10}$ particle size of from about 1.0 μm to about 3.0 μm; and/or
    wherein the particulate lithium manganese nickel spinel compound has a $D_{90}$ particle size of from about 8.0 μm to about 15.0 μm.

6. The process according to claim 1, wherein the Mn-containing precursor comprises $MnCO_3$; and/or
    wherein the Ni-containing precursor comprises $Ni(OH)_2$ or a hydrated form thereof; and/or
    wherein the Li-containing precursor comprises LiOH or a hydrated form thereof.

7. The process according to claim 1, wherein the composition is a slurry comprising a solvent, the Mn-containing precursor, the Ni-containing precursor, and the Li-containing precursor.

8. The process according to claim 7, further comprising a step of drying the slurry after the milling step (a) and before the calcining step (b).

9. The process according to claim 1, wherein step (a) is carried out in a Pearl mill.

10. The process according to claim 1, wherein in step (b) calcination is performed at a temperature of 350-950° C.

11. The process according to claim 1, wherein the particulate lithium manganese nickel spinel compound has a composition according to Formula I:

$$Li_xMn_yNi_zM_aO_b \qquad \text{Formula I}$$

wherein: M is one or more elements that are Al, Mg, Ti, Co, Cu or Cr;
$0.8 \leq x \leq 1.2$;
$y = 2-z-a$;
$0.2 < z < 1.2$;
$0 \leq a \leq 0.06$; and
$3.5 \leq b \leq 4.5$.

12. A process according to claim 11, wherein
$0.9 \leq x \leq 1.1$;
$0.3 < z < 0.5$;
$0.04 \leq a \leq 0.06$; and
$3.9 \leq b \leq 4.1$;
and wherein M is Al.

13. The process according to claim 1, further comprising forming a positive active electrode material comprising the lithium manganese nickel spinel compound.

14. The process according to claim 13, further comprising forming an electrode comprising the positive active electrode material according to claim 13.

15. The process according to claim 14, further comprising constructing a lithium secondary cell or battery comprising the electrode according to claim 14.

16. The process according to claim 1, wherein the composition further comprises an M-containing precursor, wherein M is one or more elements that are Al, Mg, Ti, Co, Cu or Cr.

17. The process according to claim 16, wherein the Mn-containing precursor, Ni-containing precursor, or Li-containing precursor contains two or more of Mn, Ni or M.

18. The process according to claim 16, wherein each of the Mn-containing precursor, Ni-containing precursor, Li-containing precursor and M-containing precursor contain less than 5 wt % nitrate with respect to the weight of metal element in the precursor.

19. The process according to claim 16, further comprising preparing a slurry comprising a solvent, an Mn-containing precursor, a Ni-containing precursor, a Li-containing precursor and an M-containing precursor before step (a).

20. The process according to claim 16, wherein the M-containing precursor comprises an Al-containing precursor.

* * * * *